Nov. 20, 1928.  1,692,386
O. G. SCHMITT
APPARATUS FOR MAKING PADS
Filed Nov. 10, 1926   10 Sheets-Sheet 1
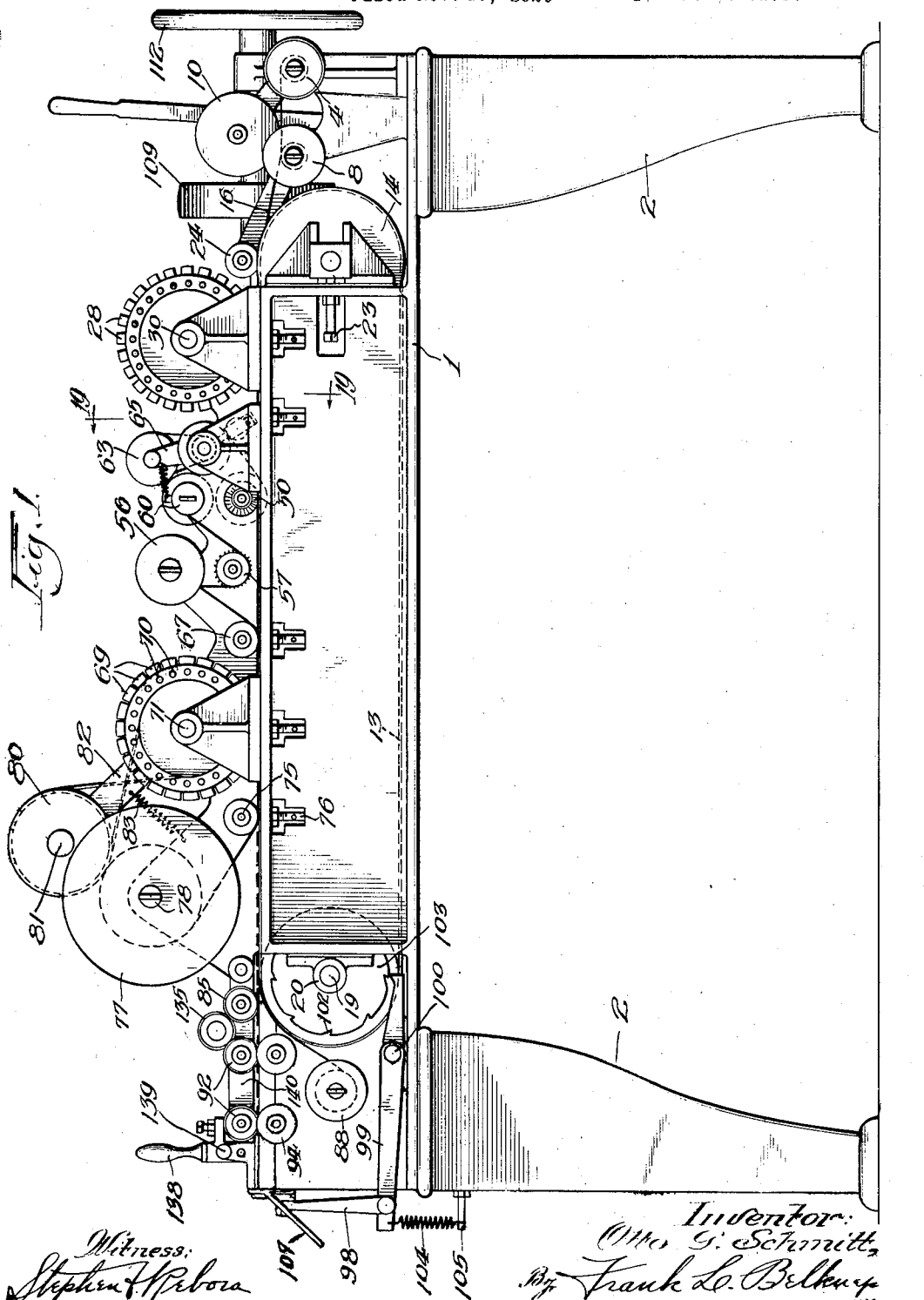

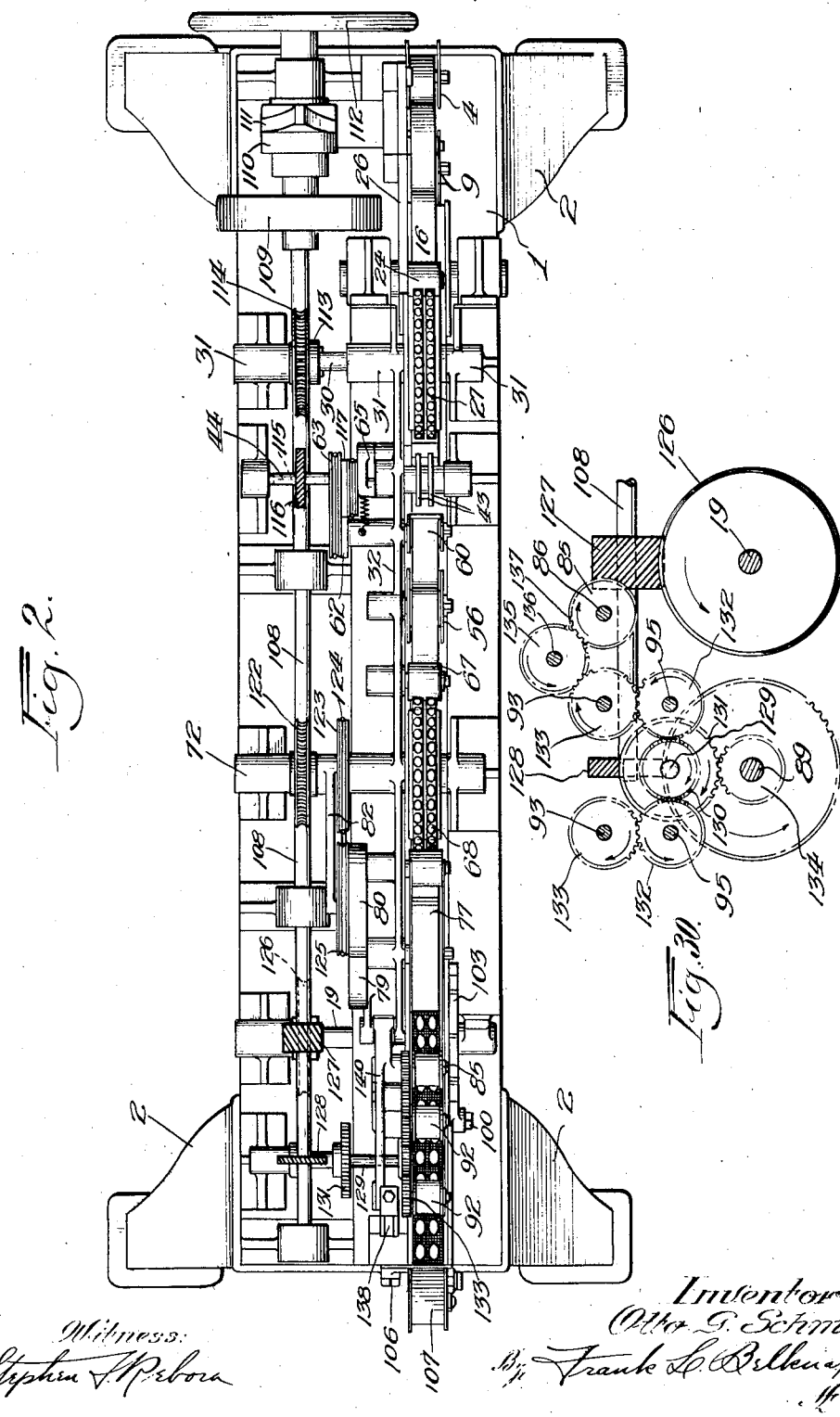

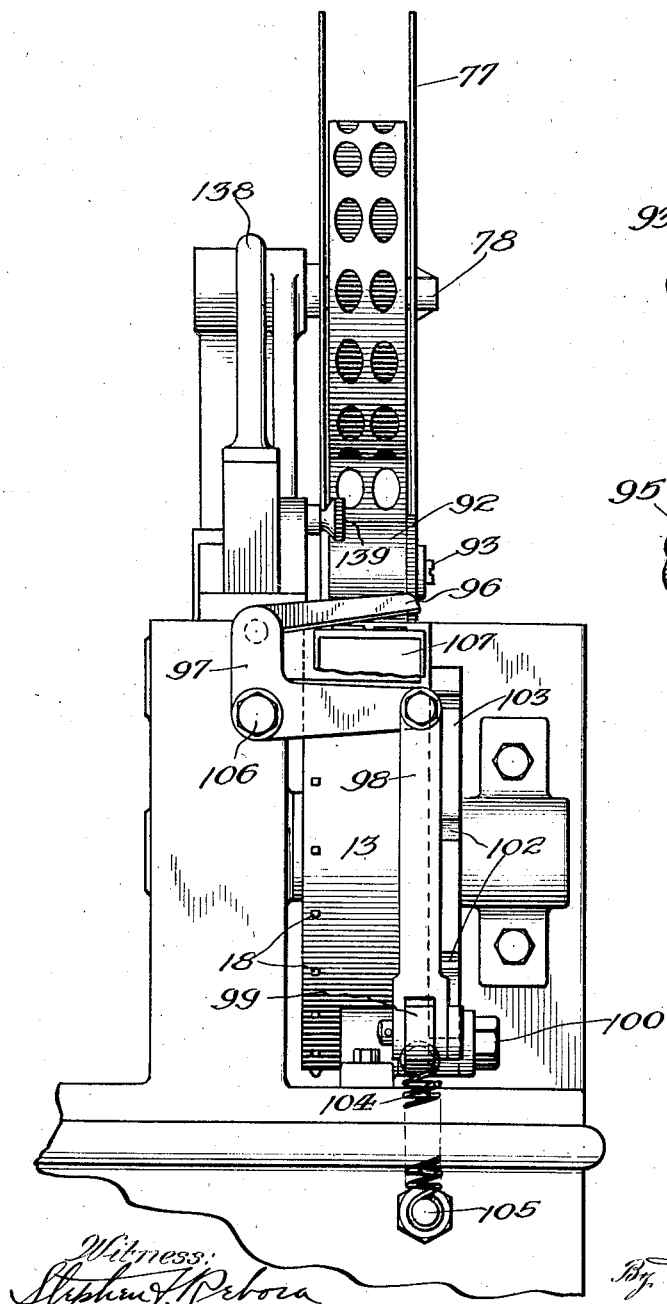
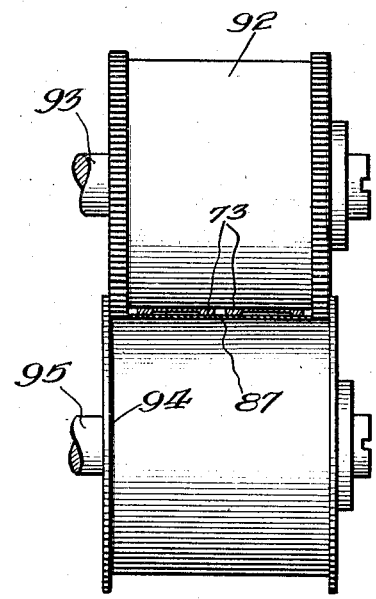

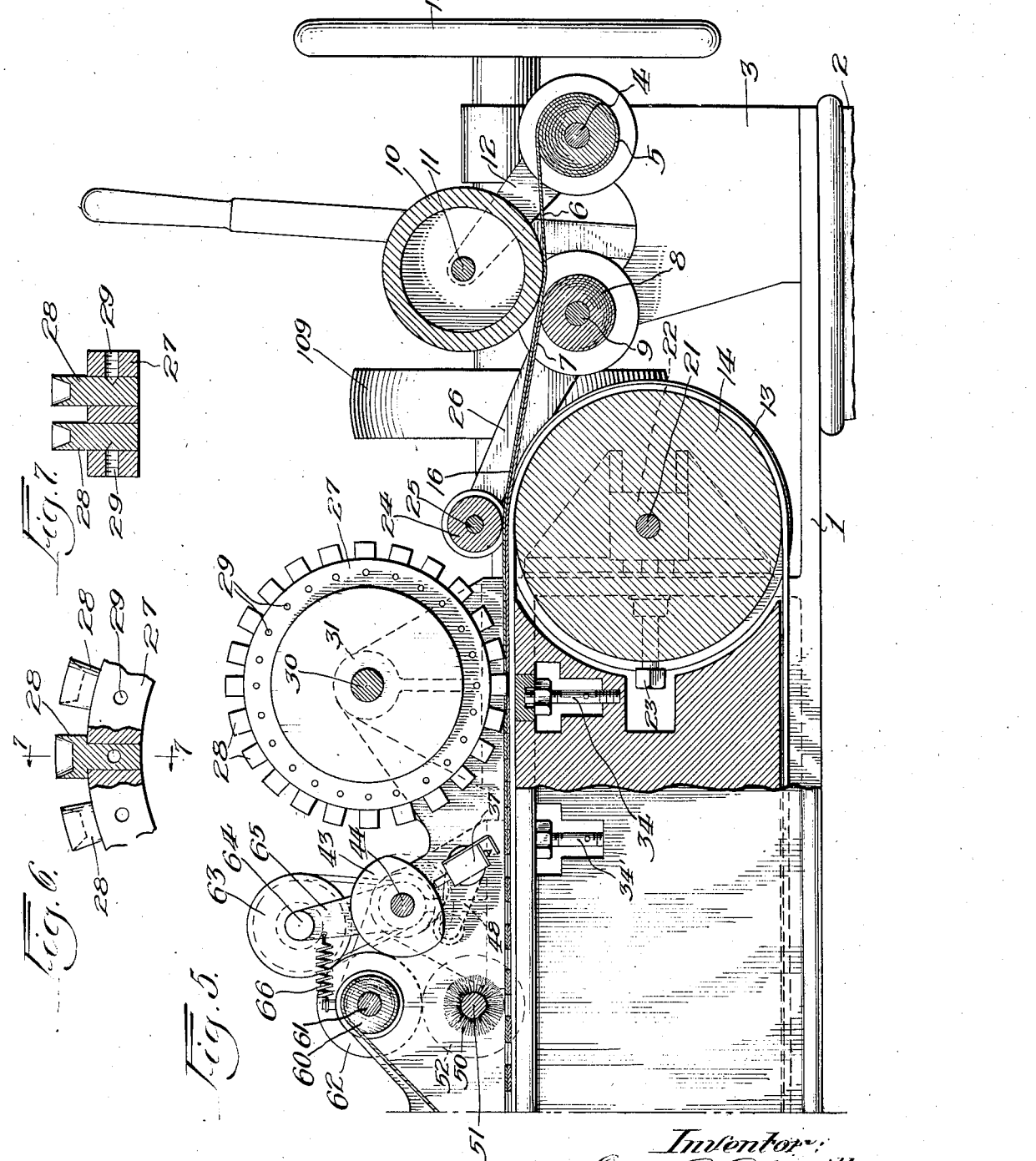

Nov. 20, 1928.
O. G. SCHMITT
APPARATUS FOR MAKING PADS
Filed Nov. 10, 1926 10 Sheets-Sheet 5
1,692,386
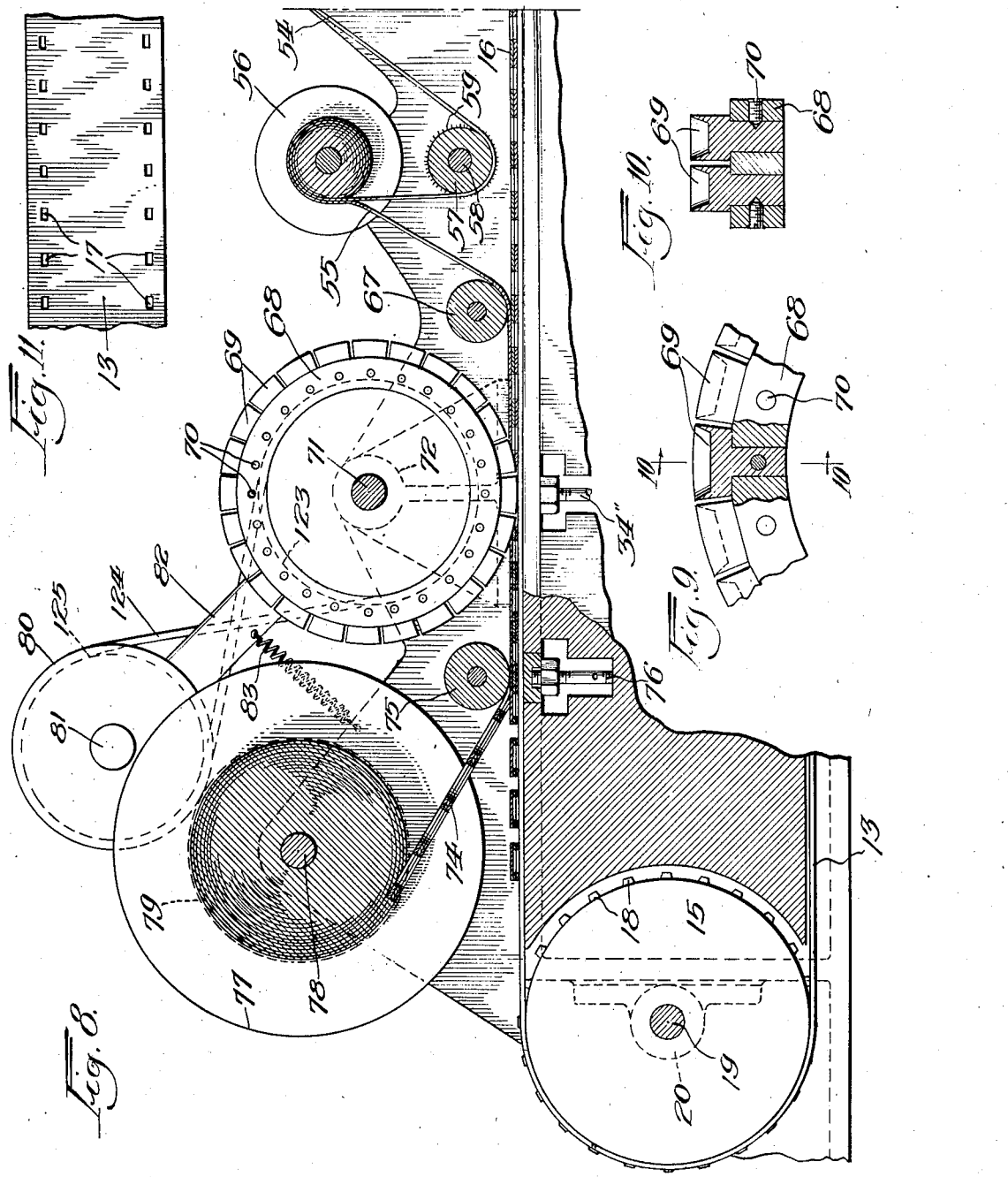

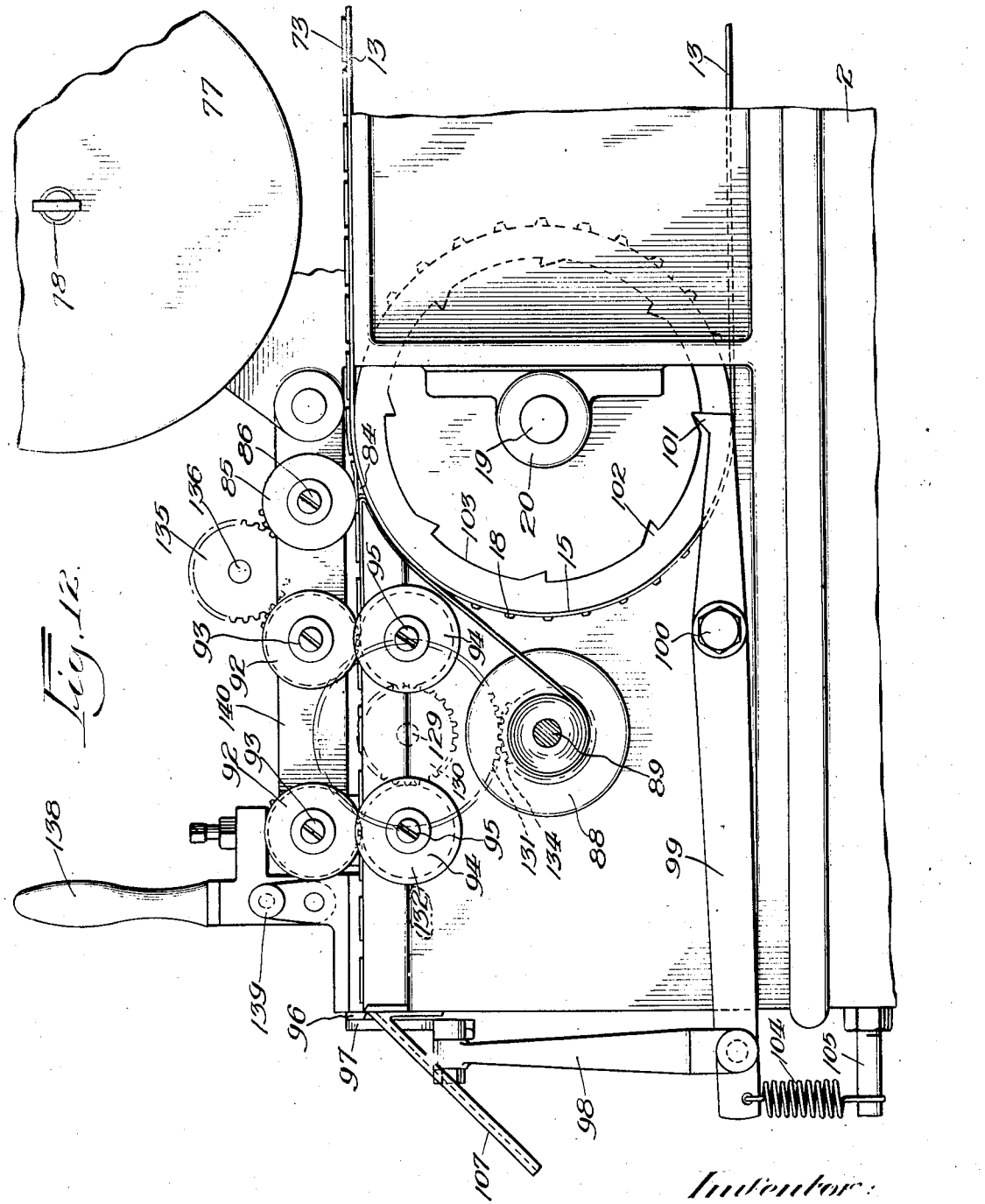

Nov. 20, 1928.
O. G. SCHMITT
1,692,386
APPARATUS FOR MAKING PADS
Filed Nov. 10, 1926     10 Sheets-Sheet 7
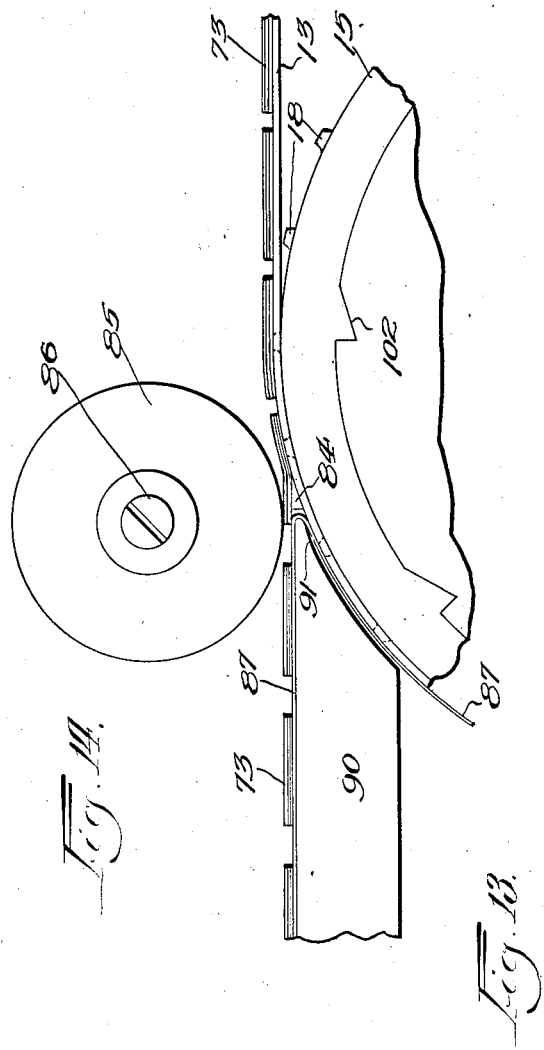
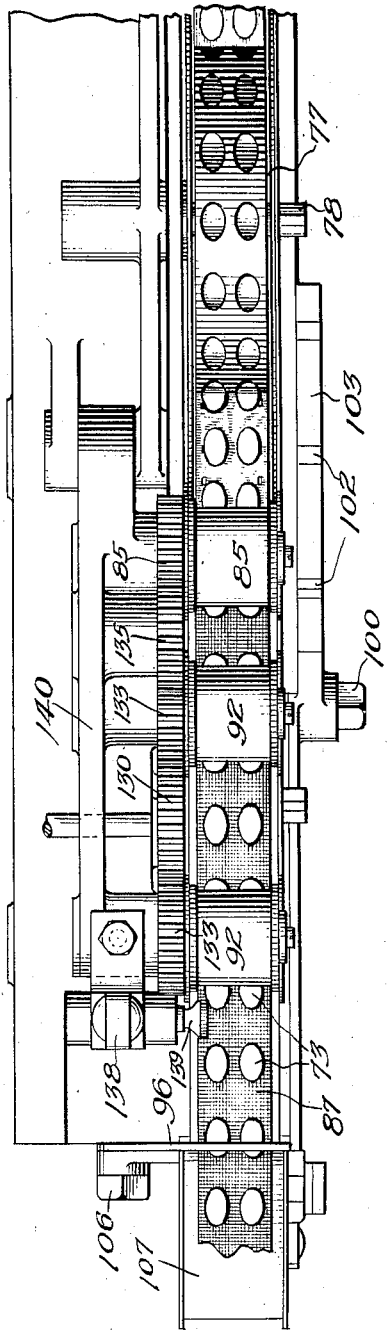

Nov. 20, 1928.
O. G. SCHMITT
1,692,386
APPARATUS FOR MAKING PADS
Filed Nov. 10, 1926   10 Sheets-Sheet 8
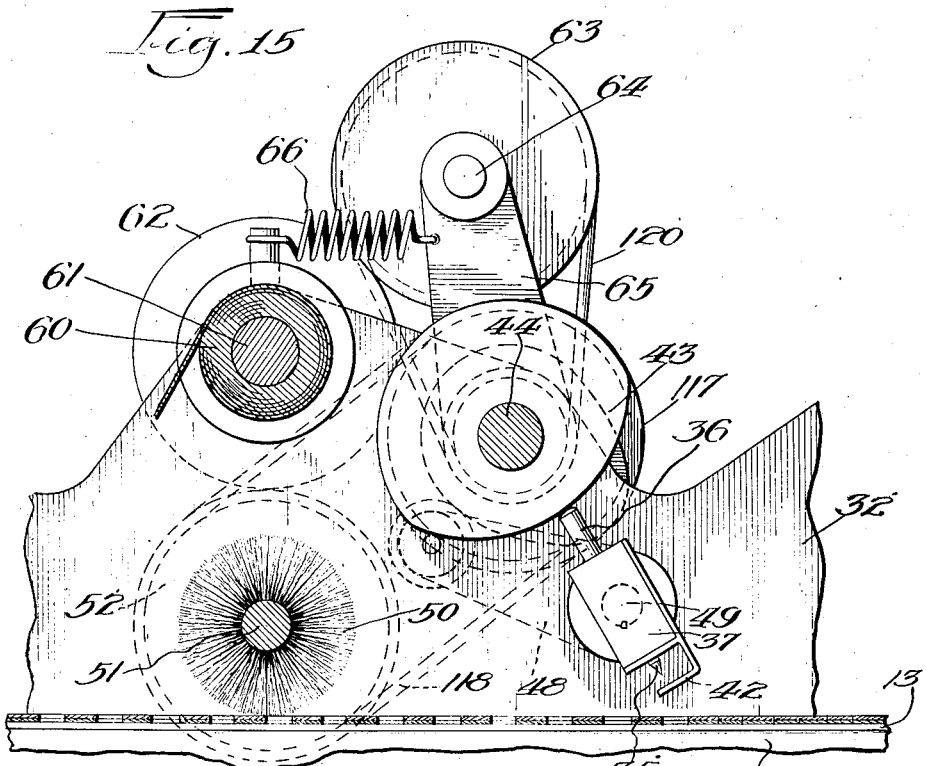
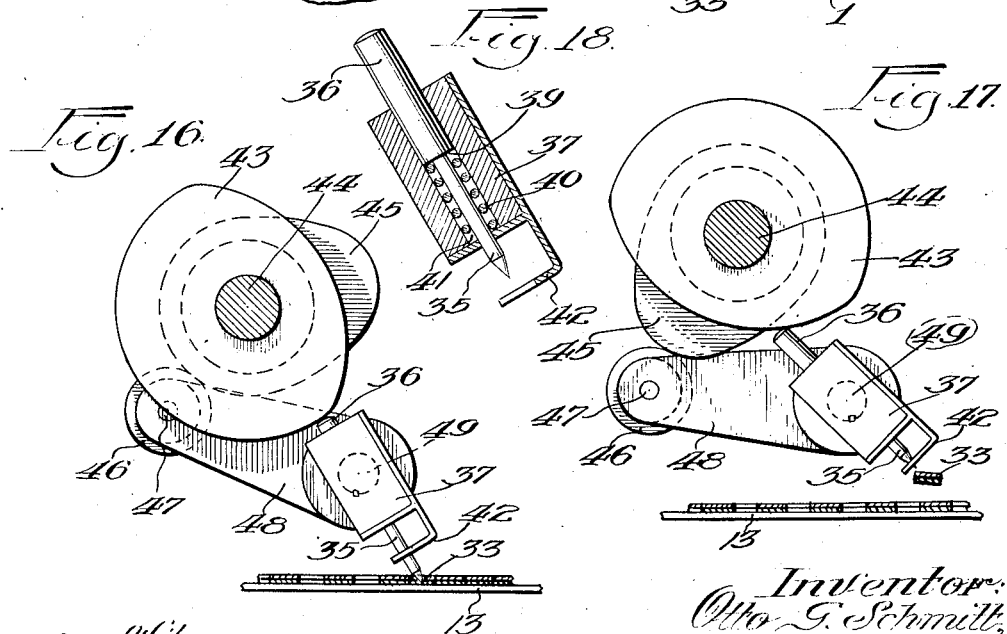

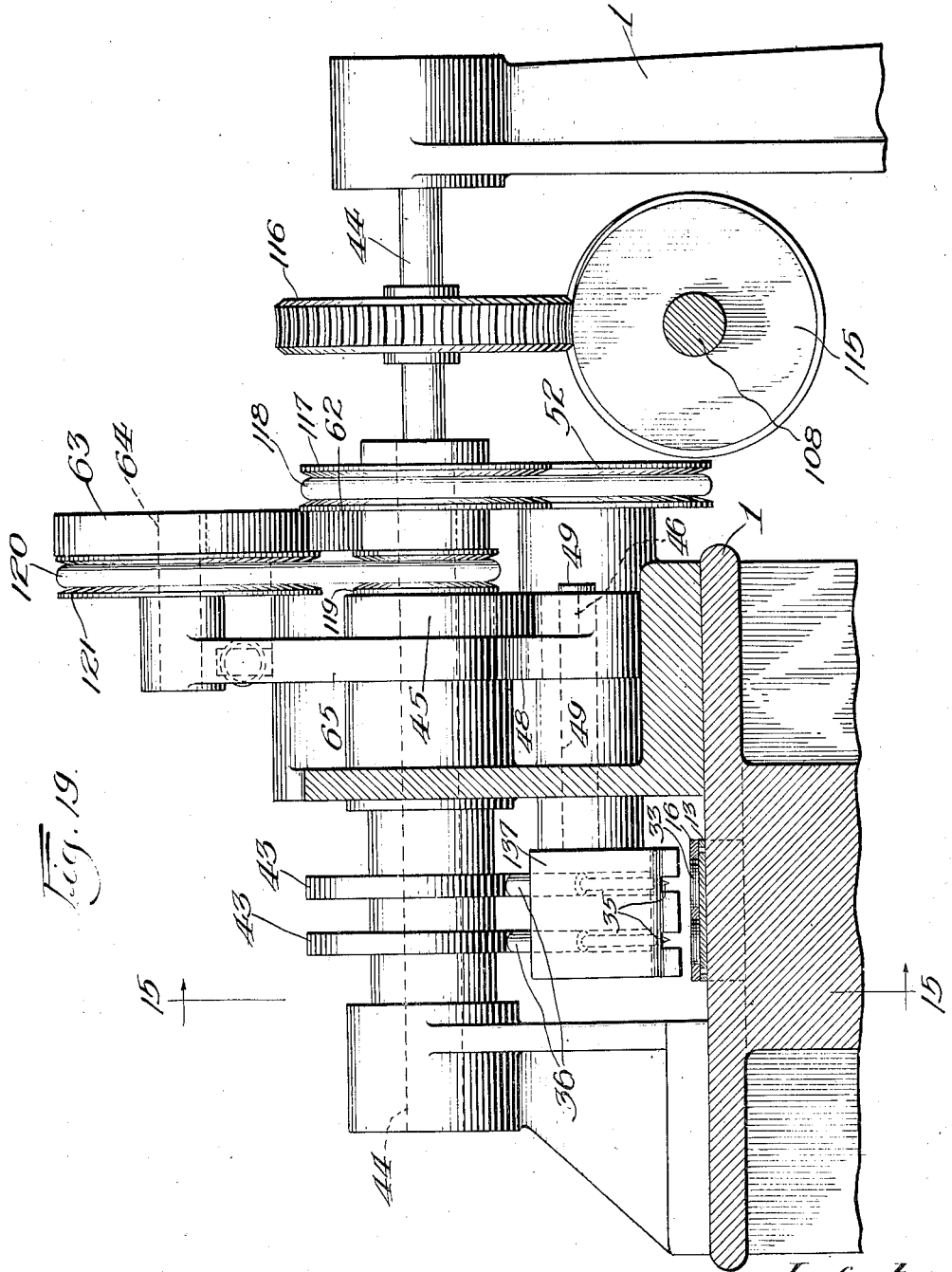

Nov. 20, 1928.
O. G. SCHMITT
1,692,386
APPARATUS FOR MAKING PADS
Filed Nov. 10, 1926        10 Sheets-Sheet 10
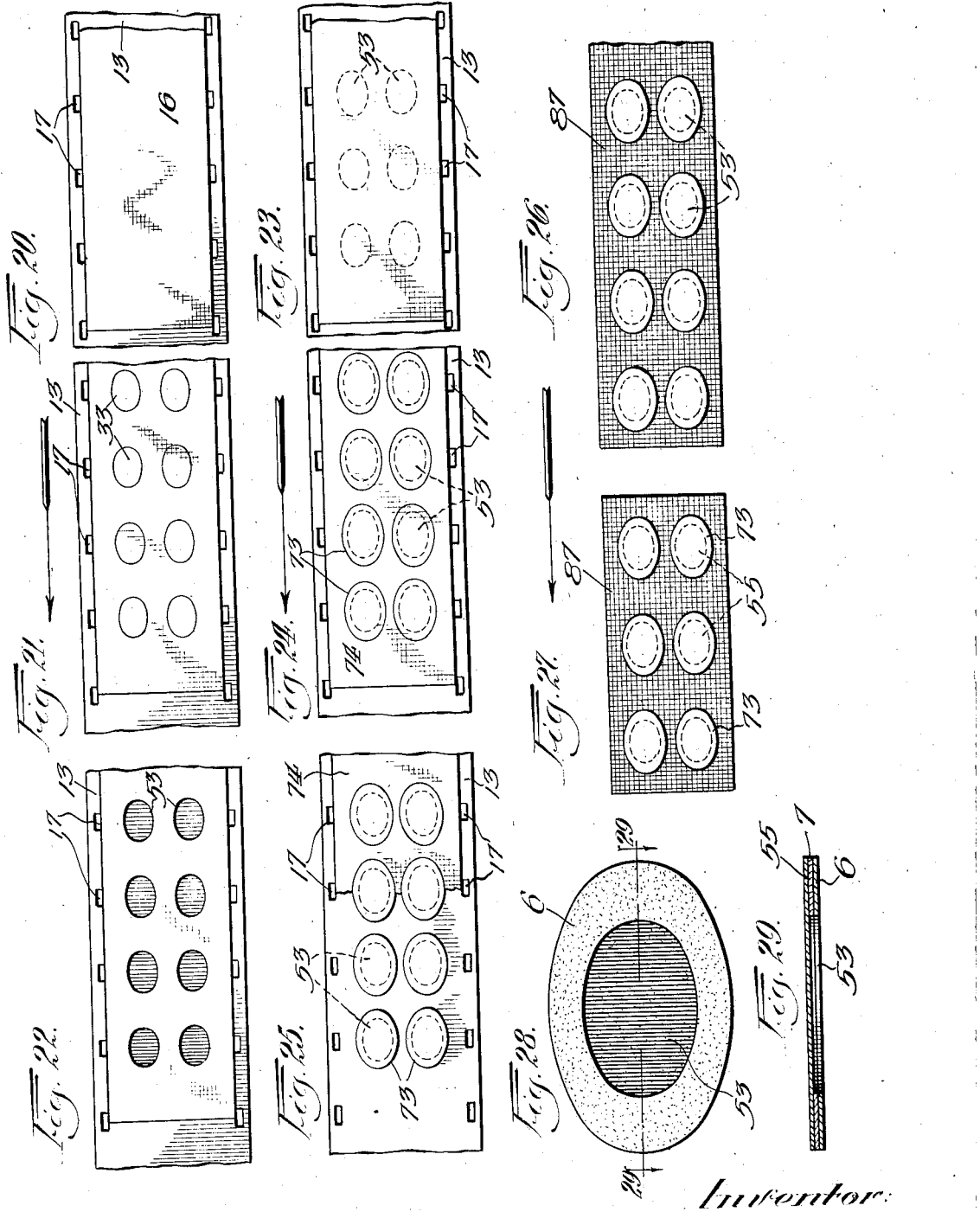

Patented Nov. 20, 1928.

1,692,386

UNITED STATES PATENT OFFICE.

OTTO G. SCHMITT, OF CHICAGO, ILLINOIS.

APPARATUS FOR MAKING PADS.

Application filed November 10, 1926. Serial No. 147,604.

The present improvement relates more specifically, to a machine particularly designed to operate on a continuously advancing strip of raw material to automatically produce pads or plasters to be applied to corns, bunions and similar ailments of the feet.

The essence of the present invention resides in a machine which is completely automatic in operation, producing the pads or plasters described above as part of a continuous operation, resulting in increased output and high efficiency.

The machine of the present invention, briefly described, comprises means for automatically feeding strips of raw material from which the pads are made to a rotary die which cuts the centers from said strip. An automatically operated picker removes the centers, and a brush or similar element working in conjunction with said picker removes these centers from the path of forward movement of the strip. Another strip of raw material is then automatically applied to the surface of said forwardly moving strip, and the multi-ply strip having the center holes is fed to a rotary die which operates on the multi-ply strip to mark out or define the outside edges of the pad. The outside waste from around these pads is then automatically removed, and the pads carried along to a device for automatically stripping them from their carrier and applying same to the surface of a moving sheet of gauze-like material. This gauze-like material is fed forward to a severing device which is automatically operated to sever the gauze into individual strips containing a predetermined uniform number of pads adhering to one surface. These individual strips are then ready for packing.

The entire operation from the feeding of the raw material to the collecting of the pads on individual sheets of gauze is entirely automatic. The machine of the present invention results in a greatly increased quantity of pads being produced in a given length of time, as compared with the semi-automatic machines in use at the present time.

It is an object of this invention to provide an improved method and machine whereby the raw material in strip form is automatically fed to the machine. It is also an object of the invention to provide, in a machine of the character described, revolving die cutting wheels to cut out the centers and the pads per se while operating at a very high rate of speed, thus eliminating the noise and vibration normally occurring in a reciprocating punch press.

It is a further object of the invention to provide, in a machine of the character described, picking needles to pick out the centers of waste material by a cam action without injuring the pads and the traveling conveyor on which they are moving forward, while simultaneously providing mechanism in the form of a revolving brush for automatically removing these waste centers.

Another object of the present invention is to provide, in a machine of the character described, mechanism for removing the outside waste comprising the material between the pads after the second revolving die is operated on the forwardly moving strip.

It is a still further object of the present invention to provide, in a machine of the character described, mechanism for stripping the pads from the conveyor on which they are traveling forward, and automatically applying them to suitable gauze, and simultaneously providing mechanism whereby the gauze to which the pads have been applied is cut into convenient lengths to be packed.

Many other important objects and advantages of the present invention will be more clearly apparent from the following description:

Fig. 1 is a side elevational view;

Fig. 2 is a top plan view; and

Fig. 3 is an end elevational view of the machine of the present invention;

Fig. 4 is an enlarged fragmentary detail view of the mechanism for applying the pads to the gauze;

Fig. 5 is an enlarged fragmentary side elevational view, partly in vertical section, illustrating the forward end of the machine;

Fig. 6 is an enlarged fragmentary detail view, partly in section, illustrating the connection between the individual dies and the rotary wheel;

Fig. 7 is a cross-sectional view on line 7—7 of Fig. 6;

Fig. 8 is an enlarged fragmentary elevational view, partly in vertical section, similar to the illustration in Fig. 5, but illustrating the central portion of the machine;

Fig. 9 is an enlarged fragmentary detail view, partly in section, illustrating the connection between the dies and the rotary wheels;

Fig. 10 is a cross-sectional view on line 10—10 of Fig. 9;

Fig. 11 is a fragmentary plan view of the conveyor belt;

Fig. 12 is an enlarged fragmentary elevational view, illustrating the finishing end of the machine;

Fig. 13 is a fragmentary top plan view of the machine between the revolving wheel for cutting out the pads and the finishing end of the machine;

Fig. 14 is an enlarged fragmentary elevational view, illustrating the mechanism for simultaneously stripping the pads from the conveyor and applying them to the gauze;

Fig. 15 is a cross-sectional view, taken on line 15—15 of Fig. 19;

Fig. 16 is an elevational detail, illustrating the high part of the cam actuating the picker to force the latter into contact with the center to be removed;

Fig. 17 is a similar view, illustrating a double cam arrangement simultaneously operable to permit the removed centers to be lifted from the strip and brushed off;

Fig. 18 is an enlarged cross-sectional view, illustrating the construction of the plunger and picker;

Fig. 19 is a cross-sectional view taken on line 19—19 of Fig. 1;

Fig. 20 is a fragmentary plan view to illustrate the strip before being operated upon;

Fig. 21 is a similar view subsequent to the first center cutting operation;

Fig. 22 is a similar view subsequent to the operation which picked up and removed these waste centers;

Fig. 23 is a similar view subsequent to the step of uniting another strip of raw material to the surface of the strip illustrated in Fig. 22;

Fig. 24 is a similar view taken subsequent to the operation which cut and stamped the outline of the finished pad;

Fig. 25 is a similar view subsequent to the removal of the waste around the outside of the cut pads;

Fig. 26 is a similar view subsequent to the stripping of the individual pads from the belt, shown in Fig. 25, to the gauze, and illustrating a wider spacing between adjacent rolls of pads;

Fig. 27 is a similar view illustrating a sheet of gauze cut to a convenient length, on the surface of which is applied a predetermined number of pads;

Fig. 28 is a bottom plan view of a pad made in accordance with the present invention;

Fig. 29 is a cross-sectional view taken on line 29—29 of Fig. 28; and

Fig. 30 is an enlarged elevational view of the gearing arrangement for driving the gauze at a higher speed than the conveyor.

Referring more in detail to the drawings, 1 indicates a frame supported on legs 2. A supporting bracket 3 is used to support a spool or reel 4 on which is wound a roll of adhesive tape 5 (Fig. 5). This adhesive tape 5 is manufactured as a commercial product in rolled form, as indicated by the numeral 5, and comprises a strip of cloth which, in the present instance, is two inches wide, on one surface of which is applied a sticky adhesive material. This is the material with which the present invention deals.

A strip of this adhesive material is designated by the numeral 6 (Fig. 5). This material is fed forward, with the adhesive surface facing downwardly, and is brought into contact with a second strip of similar adhesive material designated 7. The second strip of adhesive material is fed from a wound up roll 8 of this material mounted on the spool 9 and supported, in an obvious manner, by an arm of the supporting bracket 3. Directly adjacent the point of contact between the forwardly moving strips of adhesive material 6 and 7 is mounted a pressure element comprising a roll 10 carried on the shaft 11, which in turn is mounted on the swinging lever 12, the arrangement being such that the roller 10 will remain in close contact at the point of union of strips 6 and 7 to compensate for the decrease in diameter of the roll 8 as the strip 7 is unwound therefrom.

An endless belt or suitable conveyor 13 running around rollers or wheels 14 and 15 receives the double thickness strip which, for convenience, may be designated 16. This belt may comprise a flat, endless belt of flexible steel or other suitable material, and on opposite edges may be provided with the internal apertures 17 (Fig. 11), adapted to register with the teeth 18 carried on the periphery of the roll 15. The roll 15 is mounted on a shaft 19 which is driven, as will be hereinafter more particularly described. The shaft 19 may be mounted in a suitable bearing 20 disposed for suitable obvious adjustment relative to the main supporting structure. The roller 14 may be mounted on the shaft 21, which in turn may be journaled in the square bearing 22 and similarly mounted for obvious mechanical adjustment relative to the main supporting structure by means of manipulation of the screw illustrated diagrammatically at 23.

The double thickness strip of adhesive material designated 16, with an adhesive surface facing downwardly and a non-adhesive surface facing upwardly, is fed forward from the point where they unite together, past the pressure or auxiliary draw roll 24 mounted on shaft 25, which in turn is carried by the swinging lever 26 mounted for swinging movement on the shaft of the spool 9. The adhesive surface of the double thickness strip adheres to the face of the endless conveyor 13.

This double thickness strip is now passed to a device for cutting centers therein, which in the present instance comprises a rotary wheel 27 on the periphery of which are mounted uniformly spaced interchangeable cutting dies 28, which in the present instance may be oval-shaped. In the construction illustrated in the drawings, the rotary wheel 27 carries a double row of these cutting dies 28 held in position by means of the adjustable set screws 29. The rotary wheel 27 is mounted on the shaft 30 journaled in the bearing 31 of the supporting bracket 32.

A reference to Figs. 20 and 21 will indicate the operation which has been performed on the double thickness strip 16 by means of the cutting dies 28. More specifically (Fig. 21), these dies have cut through the double thickness strip to produce the oval-shaped centers 33. A height adjusting means, illustrated diagrammatically at 34, which may comprise a screw and lock nut, insures a clean cutting through the double thickness strip by causing the endless belt 13 to run closely against the cutting dies 28.

The double thickness strip having cuts of the shape illustrated at 33 therein now passes to the mechanism for automatically picking up and removing these centers 33 which have become waste material. This mechanism for picking up these centers comprises a needle 35 fixedly connected with a plunger 36 mounted for reciprocating movement in a channel 41 of the housing 37. The diameter of the plunger 36 is preferably greater than the diameter of the needle 35 to provide a shoulder 39, operating against the tension of a coil spring 40 enclosed in the channel 41 of the housing 37. The housing 37 has fixedly connected thereto a bifurcated projection 42 through which bifurcated element the point of the needle 35 is adapted to reciprocate. This bifurcated extension 42 functions to remove the center 33 which is picked up by the needle 35 when the coil spring 40 forces the needle 35 and plunger 36 to be reciprocated to normal position, as will now be explained.

The inner end of the plunger 36 contacts a cam 43 keyed to a shaft 44, driven as will hereinafter be explained. When the high part of the cam 43 is riding in contact with the plunger 36, this plunger will force the needle 35 into the center 33, while simultaneously a cam 45 keyed to shaft 44 contacts an element to move the entire housing 37 upwardly, carrying this waste center 33 with it. This mechanism for imparting an upward movement to the entire housing 37 comprises a roller 46 mounted on a shaft 47, which is carried in an arm 48 keyed to a shaft 49. The housing 37 is also keyed on said shaft 49. The shaft 49, being journaled in suitable bearings, will constitute a fixed pivot, merely rotating to raise and lower the housing 37 while the shaft 47, which is not journaled in the main supporting structure will constitute a moving pivot to rock the arm 48 and consequently the housing 37.

The waste centers 33 are removed from the needle 35 and dropped onto the forwardly moving double thickness strip when the needle 35 resumes, through the tension of the coil spring 40, its normal position, which tension 40 is exerted when the low part of the cam 43 is contacting the plunger 36, thus permitting the needle to pass through the bifurcated element 42, which dislodges or removes these center pieces from engagement with the needle.

A means, such as illustrated diagrammatically at 34', is provided, which in the present instance is shown as comprising a screw and lock nut, for the purpose of adjustment to insure that the endless conveyor 13 moves forward at the proper height relative to the picking needle.

It is to be noted (Fig. 19) that for a double thickness strip two inches wide, such as contemplated in the instant description, I may provide a double row of needles, plungers, and cams 43, each operating synchronously.

The mechanism for brushing the waste centers 33, which have been picked out and dropped as separate individual waste pieces on the forwardly moving double thickness strip, will now be described.

A brush 50 (Fig. 15) carried by a shaft 51, on which is mounted a pulley 52, is disposed in the path of forward movement of said double thickness strip, and is adapted to rotate at a rate of speed correlated to the rate of rotation of the cams 43 and 45. It is obvious that the brush 50 may comprise bristles of any desired stiffness, and also that the brush may be disposed at any angle relative to the forwardly moving double thickness strip for the purpose of permitting the waste centers 33 to be continuously brushed off the conveyor 13, to be collected in a suitable receptacle. The strip, subsequent to this brushing operation, will be in the form illustrated in Fig. 22, the numeral 53 designating the center holes through the strip from which the center pieces 33 have been removed.

The next operation upon the forwardly moving strip comprises the application and uniting of a third strip of adhesive material to the upper surface of the double thickness strip. This third strip of material is generally similar to the material fed from the spools 4 and 9 having adhesive on its under side.

In order to preserve a smooth surface on the outer layer of the finished pad, it is desirable that a strip of gauze 54 (Fig. 8) be interposed between the wound up strip of adhesive material 55. This combination of gauze and adhesive tape is manufactured as a commercial product, being carried on the spool 56. Some means, of course, must be provided for stripping off and removing the gauze 54 as the strip 55 is being unwound. This means for continuously stripping or removing the strip of gauze 54 may comprise a pin roller 57 mounted on shaft 58, and having pins or pin-like projections 59 on its surface adapted to bite into and engage with the net-like mesh of the gauze 54. This gauze 54 is wound on the roll 60 mounted on shaft 61. This shaft 61 also carries a friction roller 62 contacting friction roller 63 mounted on shaft 64, from which projects a swinging arm 65 mounted on the shaft 44. A coil spring 66 insures frictional contact between the two friction rollers 62 and 63, this spring being so regulated as to allow for slipping when the diameter of the gauze on the winding spool 61 increases.

A pressure roller 67 unites this third layer of adhesive material 55 to the surface of the double thickness strip fed thereto, thus resulting in a triple thickness strip taking the form indicated in Fig. 23 in which the numeral 53 designates the dotted line outlines of the center holes. This triple thickness strip is then fed under the rotary wheel 68 which has mounted on its periphery interchangeable cutting dies 69, larger than the cutting dies 28, adapted to make an outline of a larger oval than the oval 53, which larger outline constitutes the outline of the finished pad. These cutting dies 69 may be interchangeably and removably connected relative to the rotary wheel 68 by means of the set screws 70. The cutting wheel 68 is keyed to the shaft 71, which latter is journaled in bearing 72 comprising part of the main supporting structure. Means illustrated diagrammatically at 34″, which may comprise a screw and lock nut, may be provided for the purpose of insuring that the conveyor 13 will run closely against the cutting wheels 68 to insure a clean cutting through the triple thickness strip. Immediately subsequent to this latter cutting operation, the strip assumes the form shown in Fig. 24 in which the numeral 73 may be used to designate the outline of the oval-shaped cut made by the dies 69. The cutting dies 69 may be mounted on the periphery of the rotating wheel 68 in a double row.

The strip illustrated in Fig. 24 now passes to a mechanism for continuously and automatically removing the waste, said waste comprising the material between and around the outlines 73 illustrated by numeral 74. After passing the pressure roll 75, this waste 74 (Fig. 8) is wound on spool 77 mounted on shaft 78 journaled in the main supporting structure of the machine. The shaft 78 also has keyed to it a friction roller 79 (shown in dotted lines, Fig. 8) adapted to contact friction roller 80 mounted on shaft 81, which latter is carried by the swinging lever 82 mounted on the shaft 71. A spring 83 insures frictional contact between the two friction rollers 79 and 80, and is so regulated as to allow for slipping of roller 79 when the diameter of the waste 76 on spool 77 increases.

Means illustrated diagrammaticaly at 76, which may comprise a screw and lock nut, is provided for the purpose of insuring adjustable contact between the conveyor 13 and the pressure rolls 75. The removal of the waste 74 permits the pads, which take the outline indicated by the numeral 73 (Fig. 25), to be moved forward, still in contact with the conveyor 13 and separately spaced from each other. A glance at Figs. 28 and 29 will serve to illustrate the thicknesses and outline of the individual pads 73, the numeral 6 designating the lower layer, the numeral 7 the central layer, the numeral 55 the top layer, and the numeral 53 the center cut out in the lower and intermediate layers.

These pads 73, spaced from each other as illustrated in Fig. 25, are moved forward in contact with the steel belt to the mechanism for stripping them from the steel belt and simultaneously applying them to a strip of gauze, which mechanism will now be described.

A stripper 84 mounted in the supporting structure and presenting a knife-like edge is now interposed between the lower surface of the pad 73 and the upper surface of the conveyor 13, thus serving to strip said pads from the conveyor. Disposed immediately adjacent the stripping element 84 and mounted above the pads is a pressure roll 85 mounted on a shaft 86. This pressure roll 85 comes in contact with the upper surface of the pad 73 simultaneously with the stripping, serving to carry the pad forward and facilitating stripping action. At the same time, a strip of gauze 87 fed from a spool 88, mounted on the shaft 89, is fed upwardly from the spool and then forwardly in the direction of travel of the machine. This strip of gauze is brought into contact with the under surface of the pads immediately subsequent to the stripping action, the pressure roll 85 serving to impose the necessary pressure to cause adhesion between the pads 73 and the strip of gauze 87. A support 90 having a curved forwardly projecting portion 91 is provided for the purpose of supporting the forwardly moving gauze 87, and directing the gauze into contact with the pad at the proper point. The gauze 87 is fed forwardly by means of knurled feed rollers 92 mounted on shafts 93. The outside width of the rollers 92 is less than the inside width of companion bed rollers 94 mounted on shafts 95 (Fig. 4), and the diameter of the rollers 92 is decreased centrally to permit of a small space between the body portions of rollers 92 and 94 through which the pads and gauze are fed. Fig. 26 will illustrate the connection between the pads 73 and gauze 87, and will also serve to indicate the spacing of these pads on said strip of gauze.

It is to be noted by a comparison of Figs. 25 and 26, that the spacing between transverse rows of pads in each of these two figures is different. As another feature of the present invention, the forward speed of travel of the gauze 87, carrying the finished pads, is relatively higher than the speed of the conveyor, resulting in a spacing of the pads farther apart on the gauze 87 than on the conveyor 13. The gauze with the pads adhesively united thereto is ready now to be cut into short strips of such lengths as to have a predetermined number of pads on each strip ready for packing and sale. This cutting is done by a shear 96 (Fig. 3) mounted on the arm or lever 97. A connecting rod 98 pivotally engages the double lever 99 pivoting on the center 100. This double lever 99 has a hook-like projection 101 adapted to engage in the recesses 102 made in the periphery of the wheel 103, which latter is keyed to the shaft 19. The rotation of the shaft 19 to rotate the endless conveyor 13 will simultaneously rotate the wheel 103 and permit the hook-like projection 101 of the lever 99 to successively drop into the notches 102, in a similar manner to a pawl and ratchet arrangement. This successive registration of the pawl 101 with the notches 102 is positive, due to the coil spring 104 anchored on the other end of the lever 99 and also anchored in a projection 105 of the main supporting structure of the machine. The shape of the recesses 102 causes an instant positive engagement with the pawl 101 when a notch moves around to engagement therewith, thus rocking the lever 99 on the pivot 100 and simultaneously pulling down the connecting rod 98 to rock the arm 97 on pivot 106, resulting in the dropping of the shear 96 to sever the strip of gauze at predetermined intervals. It is to be noted that this shearing action is positively controlled, being predetermined and synchronous with the speed of travel of the conveyor 13.

It is obvious that any number of pads may be placed on a sheared strip of gauze 87, but for the purpose of illustration, I have indicated in Fig. 27 a severed strip of gauze containing six spaced pads thereon, which product is ready for shipping and for sale. After the severing operation, the strips of gauze may pass down a chute 107, to be collected in a suitable receptacle, ready for shipping.

The above completes the description of the details of the mechanism, and a description of the drive now follows.

A main shaft 108 has mounted on one end thereof a pulley wheel 109 receiving power, through the medium of a pulley belt, from any suitable source of supply, for instance, an electric motor or the like. The pulley 109 is fastened on the sleeve of a clutch 110, which may be engaged or disengaged by a clutch lever 111. The main shaft 108 is also provided with the hand wheel 112 to permit driving of the machine by hand when initially feeding into the machine the adhesive material and the gauze, when the raw material on the various spools or reels has been depleted and fresh charges of material put on these spools or reels.

The shaft 108 is provided with a triple worm illustrated diagrammatically at 113 (Fig. 2), adapted to mesh with a worm wheel 114 keyed to shaft 30 for driving the rotary cutting die wheel 27. This shaft 30 is, of course, journaled in the bearings 31, supported in an obvious manner on the main supporting frame 1.

The main shaft 108 is also provided with a spiral gear 115 adapted to mesh with a similar spiral gear 116 mounted on the shaft 44, which shaft 44 has a grooved pulley wheel 117 keyed thereto and, through the medium of the pulley belt 118, drives a similar pulley 52 mounted on shaft 51, which is the medium for driving the brush 50.

A grooved pulley wheel 119 drives, through the medium of a pulley belt 120, the grooved pulley wheel 121, which pulley wheel is keyed to shaft 64, to which shaft is also keyed the friction roller 63. Thus a synchronized drive is imparted to the cams 43, and 45, which are keyed to the same shaft 44, the brush 50 and the friction rollers 62 and 63. The shaft 108 carries a triple thread worm (not shown) adapted to mesh with a worm wheel 122 (Fig. 2), which worm wheel 122 is keyed to the shaft 71. Also keyed to the shaft 71 is a pulley wheel 123 which is adapted to drive, through the medium of the pulley belt 124, the grooved pulley wheel 125, thus simultaneously imparting drive to the rotary die cutting wheel 68 and to the friction rollers 77 and 80. The grooved pulley wheel 125 is mounted on the shaft 81.

The wheel 15, around which the endless conveyor 13 travels, is keyed to shaft 19, which shaft 19 receives its drive directly from the main shaft 108 through the medium of a worm wheel 126 adapted to mesh with a triple thread worm 127 keyed to shaft 108. Thus a positive drive is imparted to the endless conveyor 13, the adhesive contact between the double thickness strip 16 and the belt comprising the means for frictionally rotating the spools 4 and 9 and continously pulling the two strips of adhesive material therefrom. The spool 56 will be rotated in a similar manner, the adhesive contact between the strip 55 being fed therefrom and the double thickness strip to which it is united furnishing the frictional means through which a continuous strip of adhesive material is pulled from the spool 56. Similarly, the waste gauze 54 stripped thereby winds up due to the friction between the rollers 62 and 63.

Now describing the drive for the gauze to which the finished pads are applied, and the mechanism for imparting a forward movement to the gauze and pads, the shaft 108 is provided with a spiral gear (not shown), adapted to engage a spiral gear 128. This spiral gear (Figs. 2 and 30) is adapted to engage a spiral gear (not shown) mounted on shaft 129. There is also keyed to the shaft 129 a spur gear 130 and a larger driving gear 131. The spur gear 130 is adapted to mesh with the spur gears 132 mounted as shown on the shafts 95. The spur gears 132 in turn mesh with spur gears 133 mounted on shafts 93. These spur gears 132 and 133, mounted respectively on shafts 95 and 93, constitute the drive for the elements 92 and 94, which frictionally engage with the gauze-like material 87, causing same to be positively moved in a forward direction due to the knurled portions of the roller 92.

The driving gear 131 is adapted to mesh with the pinion gear 134 which is mounted on shaft 89, thus imparting drive to the spool 88 on which the gauze-like base material is wound. Drive is transmitted to the pressure roll 85, mounted on shaft 86, by the meshing of intermediate gears 135 mounted on shaft 136 and gear 137 mounted on shaft 86, as is obvious.

From the foregoing, it will be apparent that I have perfected a very novel machine of high utility, capable of producing the pads of the present invention continuously, resulting in a maximum yield per unit time of operation, since the machine is completely automatic in its operation. Due to the simplicity and arrangement of the various mechanism, the liability of interruption of operation due to mechanical difficulties has been reduced to a minimum.

I am aware that heretofore pads for use as described have been made on semi-automatic machines, but as far as I am aware, I believe I am the first to devise a machine completely automatic in operation, capable of continuously operating to produce maximum quantities of finished products.

It will also be obvious that I may produce by means of the present invention pads for the purpose described which may comprise any number of layers of adhesive tape formed into any desired outline or shape. For instance, the inner face of the outer ply may or may not have applied thereto a medicant, such as salicylic acid. In other words, the machine of the present invention contemplates the production of pads without medicant, which are used merely as a protection against the friction of the shoe, and also the production of a pad to which is applied medicant, which pad is capable of being used to medicinally treat and soften the tissue of skin to which it is applied while at the same time affording the pad-protection against the friction of the shoe, as previously explained.

The number of dies on the revolving die cutting wheels, and the spacing of same relative to each other, will depend upon the speed of operation relative to the number of finished pads desired to be produced per unit time of operation. Through the arrangement of gearing before described, the two revolving cutting wheels, the picking mechanism, the brushing mechanism, the endless conveyor, and the gauze base are all driven in synchronized timed relation with each other, as will be obvious.

Initially, when the machine is empty, a strip is fed beneath the rotatable wheels and onto the surface of the gauze, the hand wheel 112 being used to manually drive the various elements until the strip has been threaded completely through the machine.

The gauze is threaded through the rollers 92 and 94 in the following manner: Hand lever 138 may be turned to the side after pulling the bolt 139 so that the arm 140, on which the rollers 92 and 94 and the other associated mechanism are mounted, may be raised to permit the manual feeding of the gauze from a new spool.

I claim as my invention:

1. A machine comprising in combination, an endless conveyor, means for driving same, means for feeding thereto and uniting therewith and with each other, strips of adhesive tape to make a multi-layer sheet, sets of rotatable means adapted to act successively on said sheet to produce incisions of predetermined outline, means interposed between the sets of rotatable means to feed and unite another strip of adhesive tape with the aforesaid multi-layer sheet, means for removing the waste to leave separated preformed pads on the conveyor, and means for feeding to and uniting with said separated pads a base of gauze-like material.

2. A machine comprising in combination, an endless conveyor, means for driving same, means for feeding thereto a strip of adhesive tape, a rotatable die-carrying wheel acting on said strip to produce incisions of predetermined outline therein, means for picking up and eliminating as waste the severed material within the incisions, means for feeding and uniting another strip of adhesive tape to said first mentioned strip, a second rotatable die-carrying wheel adapted to act on said sheet to produce similarly shaped but larger incisions around the first mentioned incisions, means for removing as waste the material exterior of these latter incisions to leave separated pads on the conveyor, and means for feeding and uniting a base of gauze-like material to said separated pads.

3. A machine comprising in combination, an endless conveyor, means for driving same, means for feeding thereto a strip of adhesive tape, a rotatable die-carrying wheel acting on said strip to produce incisions of predetermined outline therein, means for picking up and eliminating as waste the severed material within the incisions, means for feeding and uniting another strip of adhesive tape to said first mentioned strip, a second rotatable die-carrying wheel adapted to act on said sheet to produce similarly shaped but larger incisions around the first mentioned incisions, means for removing as waste the material exterior of these latter incisions to leave separated pads on the conveyor, and means for feeding and uniting a continuous strip of gauze-like material to said separated pads, and means for severing said continuous strip into individual strips each carrying a uniform predetermined number of pads.

4. A machine comprising an endless conveyor, means for driving same, means for feeding thereto and uniting with each other a plurality of strips of adhesive tape to produce a multi-layer sheet, rotatable means adapted to produce incisions of a predetermined outline in said sheet, means for removing as waste the centers of said outlined incisions, means for feeding to and uniting with said multi-layer sheet another strip of adhesive tape, a second rotatable means acting on the sheet to produce relatively larger incisions of the same general outline around the first mentioned incisions, means for removing as waste the material around and between the latter incisions, means for stripping the formed pads from the endless conveyor, means for applying said pads to a continuous strip of gauze-like material, and means for separating said continuous strip of gauze-like material to produce individual strips of predetermined length and containing a predetermined number of pads thereon.

5. A machine comprising an endless conveyor, means for driving same, means for feeding thereto and uniting with each other a plurality of strips of adhesive tape to produce a multi-layer sheet, rotatable means adapted to produce incisions of a predetermined outline in said sheet, means for removing as waste the centers of said outlined incisions, means for feeding to and uniting with said multi-layer sheet another strip of adhesive tape, a second rotatable means acting on the sheet to produce relatively larger incisions of the same general outline around the first mentioned incisions, means for removing as waste the material around and between the latter incisions, means for stripping the formed pads from the endless conveyor, means for applying said pads to a continuous strip of gauze-like material, means operated by the movement of the endless conveyor for severing the continuous strip of gauze-like material to produce individual strips of predetermined length containing a predetermined uniform number of pads thereon.

6. A machine comprising in combination, an endless conveyor, means for driving same, means for feeding thereto a strip of flexible adhesive tape, sets of rotatable means adapted to act successively on said strip to produce incisions of predetermined outline, means interposed between the sets of rotatable means to feed and unite another strip of adhesive tape, means for continuously removing a protective strip of gauze-like material from contact with said additional strip of tape, means for removing the waste to leave separated pads on the conveyor, and means for feeding to and uniting with said separated pads a base of gauze-like material.

7. A machine comprising in combination, an endless conveyor, means for driving same, means for feeding thereto a continuous strip of flexible material, means adapted to act on said strip while moving forward on said conveyor to produce incisions of predetermined outline therein, means for removing as waste the severed material within the incisions, means for feeding and uniting another strip of material to said first mentioned strip, means adapted to act on said united sheet to produce incisions around the first mentioned incision, and means for removing as waste the material exterior of these latter incisions to leave separated pads on the conveyor.

8. A machine comprising in combination, an endless conveyor, means for driving same, means for feeding thereto a continuous strip of flexible material, means adapted to act on said strip while moving forward on said conveyor to produce incisions of predetermined outline therein, means for removing as waste the severed material within the incisions, means for feeding and uniting another strip of material to said first mentioned strip, means adapted to act on said united sheet to produce incisions around the first mentioned incision, means for removing as waste the material exterior of these latter incisions to leave separated pads on the conveyor, and means for feeding and uniting a base of gauze-like material to said separated pads.

9. A machine comprising in combination, an endless conveyor, means for driving same, means for feeding thereto a continuous strip of flexible material, means adapted to act on said strip while moving forward on said conveyor to produce incisions of predetermined outline therein, means for removing as waste the severed material within the incisions, means for feeding and uniting another strip of material to said first mentioned strip, means adapted to act on said united sheet to produce incisions around the first mentioned incision, means for removing as waste the material exterior of these latter incisions to leave separated pads on the conveyor, and means for removing the material within the first mentioned incisions comprising a cam operated picking element working in conjunction with a movable brush, the means for removing the material exterior of the second mentioned incisions comprising a mechanically operated reel on which the waste which is in the form of a continuous strip with apertures is wound.

10. A machine comprising in combination, an endless conveyor, means for driving same, means for feeding thereto a continuous strip of flexible material, means adapted to act on said strip while moving forward on said conveyor to produce incisions of predetermined outline therein, means for removing as waste the severed material within the incisions, means for feeding and uniting another strip of material to said first mentioned strip, means adapted to act on said united sheet to produce incisions around the first mentioned incision, means for removing as waste the material exterior of these latter incisions to leave separated pads on the conveyor, and means for stripping the separated pads from the conveyor and applying same to a base of gauze-like material.

11. A machine comprising in combination, an endless conveyor, means for driving same, means for feeding thereto a continuous strip of flexible material, means adapted to act on said strip while moving forward on said conveyor to produce incisions of predetermined outline therein, means for removing as waste the severed material within the incisions, means for feeding and uniting another strip of material to said first mentioned strip, means adapted to act on said united sheet to produce incisions around the first mentioned incision, means for removing as waste the material exterior of these latter incisions to leave separated pads on the conveyor, means for feeding and uniting a base of gauze-like material to said separated pads, and means for imparting an increased speed of forward travel to the gauze relative to the conveyor to space the separated pads a greater distance apart on the gauze than on the conveyor.

12. A machine comprising in combination, an endless conveyor, means for driving same, means for feeding thereto a continuous strip of flexible adhesive tape, rotatable means adapted to act on said strip to produce incisions of predetermined outline, means for removing as waste the material within the incisions, means to feed and unite to the first mentioned strip a second unsevered strip of adhesive tape, means for continuously removing a protective strip of gauze-like material from contact with said additional strip of tape, a second rotatable means adapted to act on the surface of said unsevered strip to produce incisions therein and simultaneously in the first mentioned strip surrounding the first mentioned incisions, means for removing as waste the material between the second mentioned incisions to leave separated pads on the conveyor, and means for feeding to and uniting with said separated pads a base of gauze-like material.

OTTO G. SCHMITT.